United States Patent
Matsuzaki et al.

(10) Patent No.: US 12,083,978 B2
(45) Date of Patent: Sep. 10, 2024

(54) OCCUPANT PROTECTION DEVICE

(71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Takuya Kusumura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/361,308

(22) Filed: Jul. 28, 2023

(65) Prior Publication Data

US 2024/0059239 A1 Feb. 22, 2024

(30) Foreign Application Priority Data

Aug. 17, 2022 (JP) ................................ 2022-130291

(51) Int. Cl.
*B60R 21/18* (2006.01)
*B60R 21/217* (2011.01)
*B60R 22/26* (2006.01)
*B60R 22/34* (2006.01)

(52) U.S. Cl.
CPC ............ *B60R 21/18* (2013.01); *B60R 21/217* (2013.01); *B60R 22/26* (2013.01); *B60R 22/34* (2013.01)

(58) Field of Classification Search
CPC ....... B60R 21/18; B60R 21/217; B60R 22/26; B60R 22/34
See application file for complete search history.

(56) References Cited

U.S. PATENT DOCUMENTS

| 3,948,541 | A | * | 4/1976 | Schulman | ............... | B60R 21/18 244/122 B |
| 5,390,982 | A | * | 2/1995 | Johnson | ................ | B60N 2/829 297/483 |
| 11,691,586 | B2 | * | 7/2023 | Fischer | .................. | B60R 21/01 280/733 |
| 2002/0125701 | A1 | * | 9/2002 | Devonport | ............. | B60R 21/18 280/733 |
| 2004/0178614 | A1 | * | 9/2004 | Countryman | .......... | B60R 21/18 280/743.1 |
| 2013/0264803 | A1 | * | 10/2013 | Schneider | ............... | B60R 21/18 280/733 |

(Continued)

FOREIGN PATENT DOCUMENTS

JP 2020-66425 A 4/2020

*Primary Examiner* — Frank B Vanaman
(74) *Attorney, Agent, or Firm* — Posz Law Group, PLC

(57) ABSTRACT

An occupant protection device includes a seatbelt, an inflator, an airbag and a tether. The seatbelt has a lap belt portion that restrains a waist portion of an occupant. The inflator discharges an inflating gas. The airbag is provided in the lap belt portion, and includes a bag main body portion, which receives the occupant by inflating owing to the inflating gas being supplied, and a conduit portion, which is connected to the inflator, guides the inflating gas discharged from the inflator to the bag main body portion, and causes the inflating gas to flow into the bag main body The tether links the conduit portion and a side wall portion, of a left side wall portion and a right side wall portion of the bag main body portion when inflation is completed, on a side separated from the inflator in a left-right direction.

9 Claims, 13 Drawing Sheets

(56) References Cited

U.S. PATENT DOCUMENTS

2014/0159350 A1* 6/2014 Schneider ............... B60R 21/18
                                                    280/733
2019/0283699 A1* 9/2019 Park ....................... B60R 22/46
2020/0122668 A1   4/2020 Ozaki et al.
2022/0355755 A1* 11/2022 Fischer ................... B60R 21/01

* cited by examiner

Schematic Sectional View at A-A

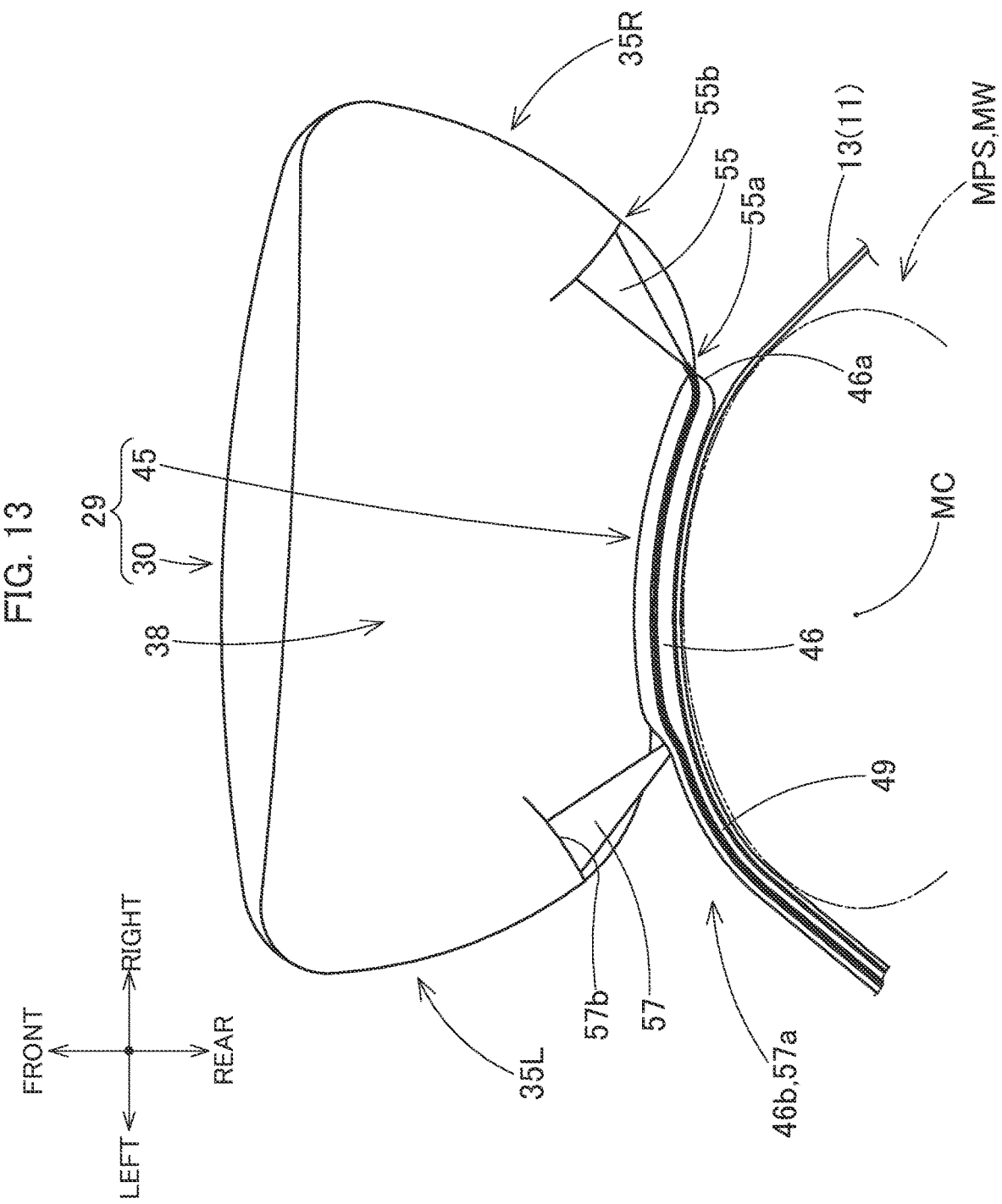

OCCUPANT PROTECTION DEVICE

The present application claims priority from Japanese Patent Application No. 2022-130291 of Matsuzaki et al, filed on Aug. 17, 2022, the disclosures of which are hereby incorporated into the present application by reference.

BACKGROUND

Technical Field

The present invention relates to an occupant protection device for protecting an occupant seated in a seat.

Description of Related Art

A configuration wherein an airbag is provided in a lap belt portion of a seatbelt restraining an occupant waist portion is already known as an occupant protection device that protects an occupant (refer to JP2020-66425A). The airbag of the occupant protection device described in JP2020-66425A has a bag main body portion, which receives an occupant by inflating owing to an inflating gas being supplied, and a conduit portion that guides an inflating gas discharged from an inflator to the bag main body portion.

A configuration of the occupant protection device described in JP2020-66425A is such that inflating gas flowing into the bag main body portion is liable to flow in a direction away from the inflator, meaning that a greater portion of the inflating gas flowing into the bag main body portion firstly comes into contact with a side wall portion, of left and right side wall portions of the bag main body portion, on a side separated from the inflator, and is subsequently diffused over a whole of the bag main body portion. This means that when inflating gas flows into the bag main body portion, pressure is liable to be exerted on the side wall portion on the side of the bag main body portion separated from the inflator, and there is concern that the bag main body portion will rise up and separate from an occupant due to the pressure, having an adverse effect on occupant protection performance.

SUMMARY

An object of the invention is to provide an occupant protection device that can restrict a rising up of a bag main body portion when an inflating gas flows into the bag main body portion from a conduit portion.

A representative configuration of an occupant protection device according to the invention is as follows.

An occupant protection device includes a seatbelt having a lap belt portion that restrains a waist portion of an occupant seated in a seat, an inflator that discharges an inflating gas, an airbag that is provided in the lap belt portion, the airbag including a bag main body portion, which receives the occupant by inflating owing to the inflating gas being supplied, and a conduit portion, which is connected to the inflator, guides the inflating gas discharged from the inflator to the bag main body portion, and causes the inflating gas to flow into the bag main body portion, and a tether that links the conduit portion and a side wall portion, of a left side wall portion and a right side wall portion of the bag main body portion when inflation is completed, on a side separated from the inflator in a left-right direction.

BRIEF DESCRIPTION OF THE DRAWINGS

FIG. 13 is a schematic lateral sectional view of the airbag when inflation is completed in the case of a small-bodied occupant when the occupant protection device operates.

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
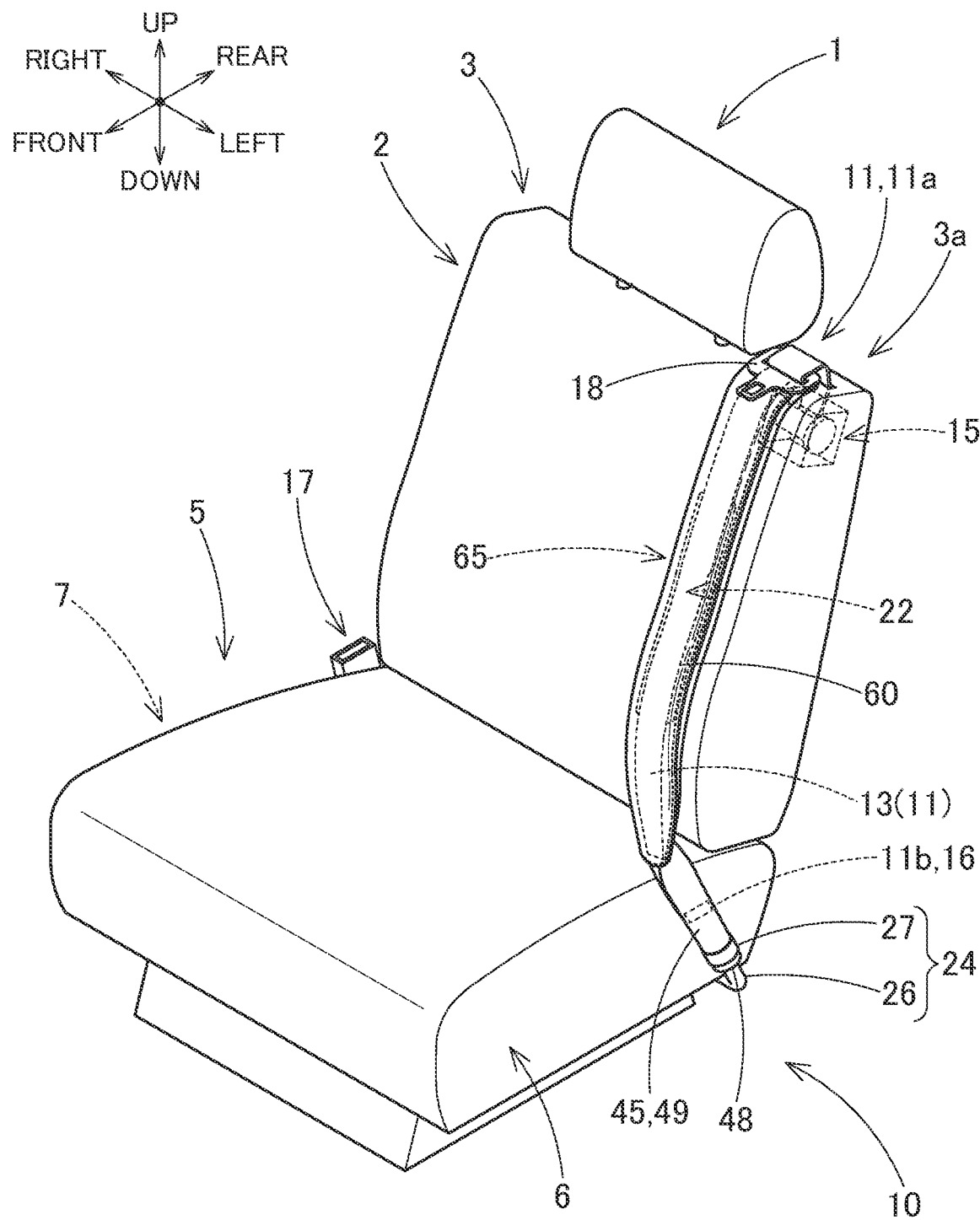
FIG. 1 is a perspective view of a seat in which an occupant protection device according to one embodiment of the invention is mounted.
Figure 2:
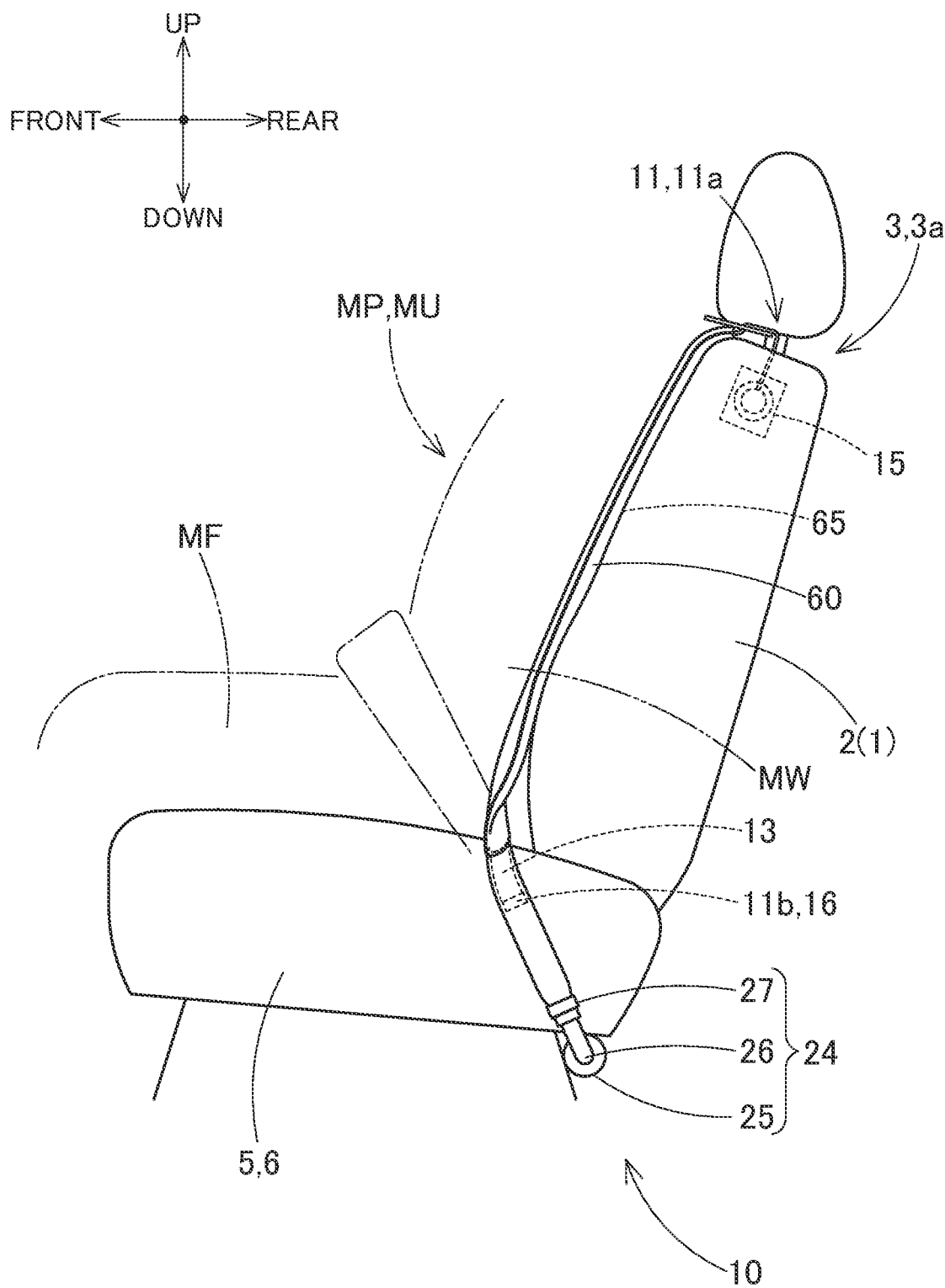
FIG. 2 is a left side view of the seat in which the occupant protection device is mounted.
Figure 3:
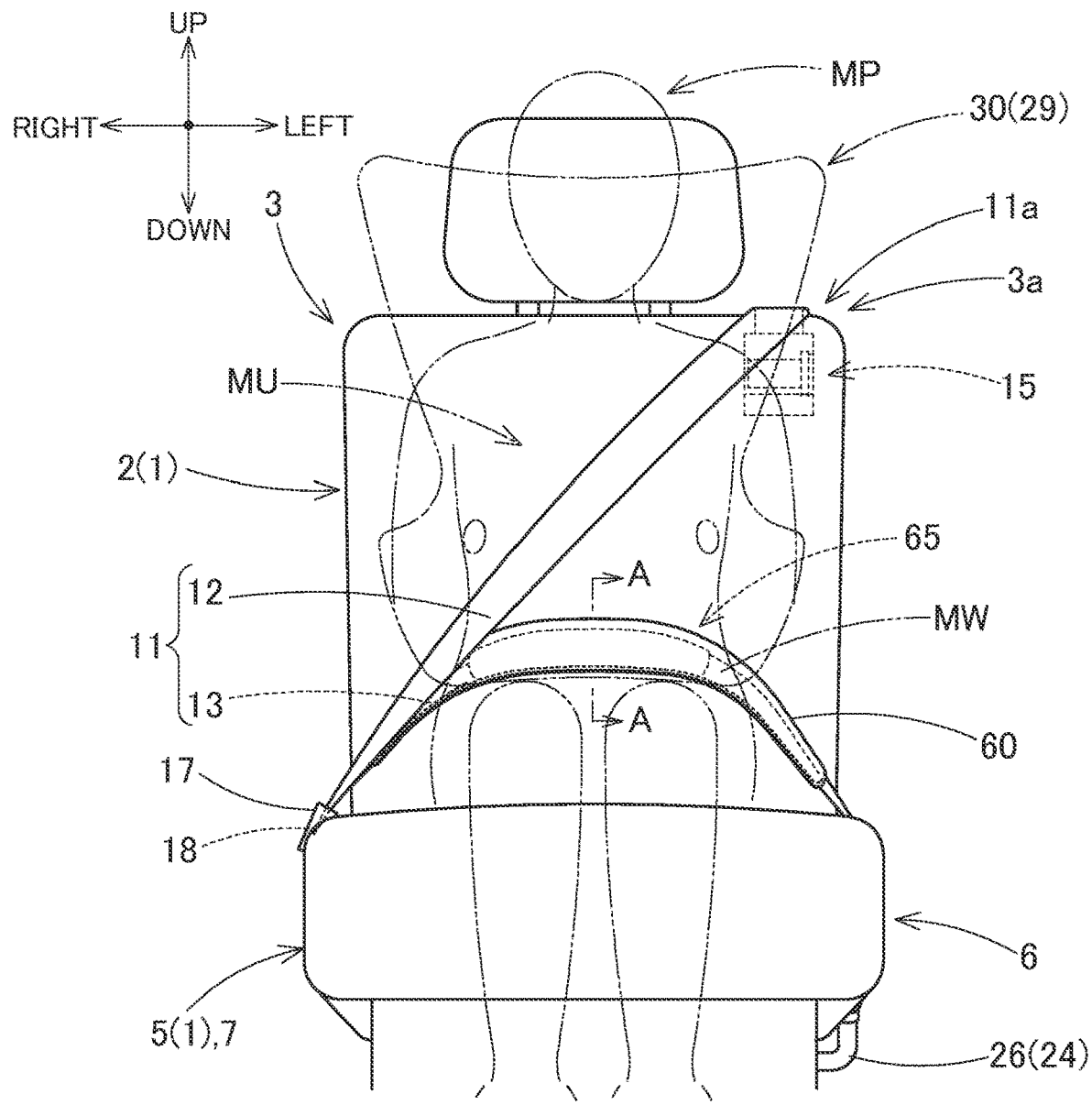
FIG. 3 is a front view of the seat in which the occupant protection device is mounted, and a sectional schematic view of an airbag.
Figure 3:
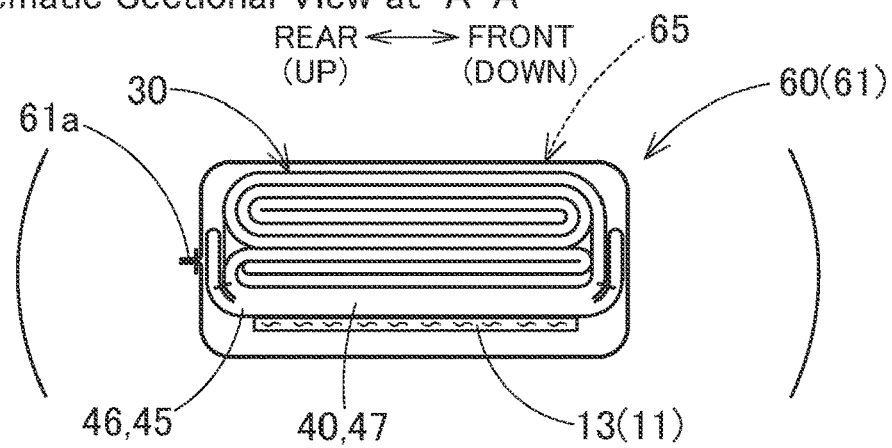
Figure 4:
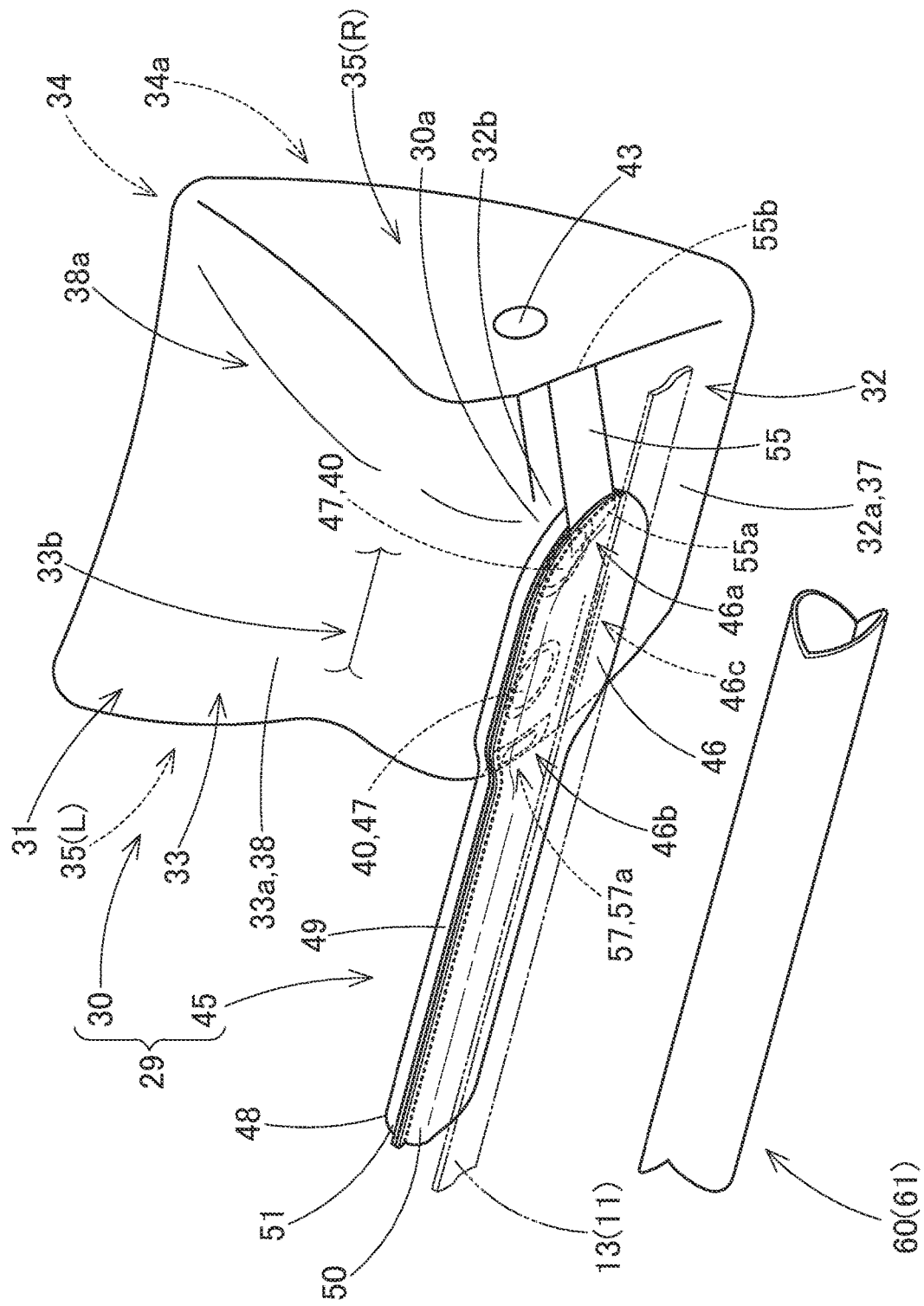
FIG. 4 is a schematic perspective view seen from a back side showing an inflated state of the airbag of the occupant protection device.

Hereafter, an occupant protection device 10 according to one embodiment of the invention will be described, based on the drawings. FIG. 1 is a perspective view of a seat 1 in which the occupant protection device 10 is mounted. FIG. 2 is a left side view of the seat 1 in which the occupant protection device is mounted. FIG. 3 is a front view of the seat 1 in a state wherein a seatbelt 11 is worn by an occupant MP, and a sectional schematic view of an airbag 29, and shows the airbag 29 when inflated as two-dotted chain lines. FIG. 4 is a perspective schematic view of the inflated airbag 29 seen from behind. As shown in FIGS. 1 to 4, the occupant protection device 10 is mounted in the seat 1 of a vehicle. The occupant protection device 10 includes the seatbelt 11, the airbag 29, and an inflator 24 acting as a gas supply device that supplies an inflating gas to the airbag 29. The seat 1 includes a backrest portion 2 and a seat portion 5.

The seatbelt 11 is a member for restraining the occupant MP seated on the seat 1. An upper end 11a side of the seatbelt 11 can be fed out from a retractor 15 (a take-up unit) provided in an interior on one left-right direction side (a left edge 3a side in the present embodiment) of an upper end 3 of the backrest portion 2 of the seat 1. A lower end 11b side of the seatbelt 11 forms a fixed end fixed to an anchor member 16 disposed on a left side portion 6 side of the seat portion 5.

Also, a tongue 18 is disposed in an intermediate region of the seatbelt 11. The tongue 18 is fastened to a buckle 17 provided on another left-right direction side (a right side portion 7 side in the present embodiment) of the seat portion of the seat 1. A state wherein the tongue 18 is fastened to the buckle 17 is a state wherein the occupant MP is wearing the seatbelt 11. The seatbelt 11 in a state wherein the tongue 18 is fastened to the buckle 17 is such that a region that extends from the tongue 18 to the retractor 15 side is a shoulder belt portion 12 disposed on a front face side of an upper body MU of the occupant MP, and a region that extends from the tongue 18 to the fixed end 11*b* side is a lap belt portion 13 that is disposed on a front face side of a waist portion MW of the occupant MP, and restrains the waist portion MW. An unshown release button is disposed on the buckle 17, and the tongue 18 can be removed from the buckle 17 by carrying out a pressing operation of the release button when releasing the fastening of the tongue 18. The retractor 15 has a pretensioner that causes the drawing out to stop when there is an abrupt drawing out of the seatbelt 11, and furthermore, can take up the drawn out seatbelt 11 when there is a collision or the like of the vehicle.

The inflator 24 as the gas supply device is attached and fixed to the left side portion 6 on a back side of the seat portion (refer to FIGS. 1 and 2). The inflator 24 includes an approximately cylindrical inflator main body 25, which discharges an inflating gas, and a pipe portion 26 disposed bent into an approximate L-shape protruding from the inflator main body 25. A leading end portion 48 side of a conduit portion of the airbag 29, to be described hereafter, is connected to the pipe portion 26. Specifically, the conduit portion 45 is mounted on an exterior of the pipe portion 26, and connected (coupled) by fastening from above with a clamp 27.

As shown in FIG. 4, the airbag 29 includes a bag main body portion 30, which inflates significantly owing to inflating gas being caused to flow in, and receives the occupant MP, and the conduit portion 45, which communicates with a lower end 30*a* side of the bag main body portion 30, guides inflating gas discharged from the inflator 24 to the bag main body portion 30, and causes the inflating gas to flow into the bag main body portion 30. Also, the airbag 29 includes a regulating tether 55 (a tether, a first tether), which links the conduit portion 45 and the bag main body portion 30, and a regulating tether 57 (another tether, a second tether), which links the conduit portion 45 and the bag main body portion 30 in a position differing from that of the regulating tether 55. The bag main body portion 30, the conduit portion 45, and the regulating tethers 55 and 57 are formed of a woven fabric having flexibility, such as polyester.

Figure 7:
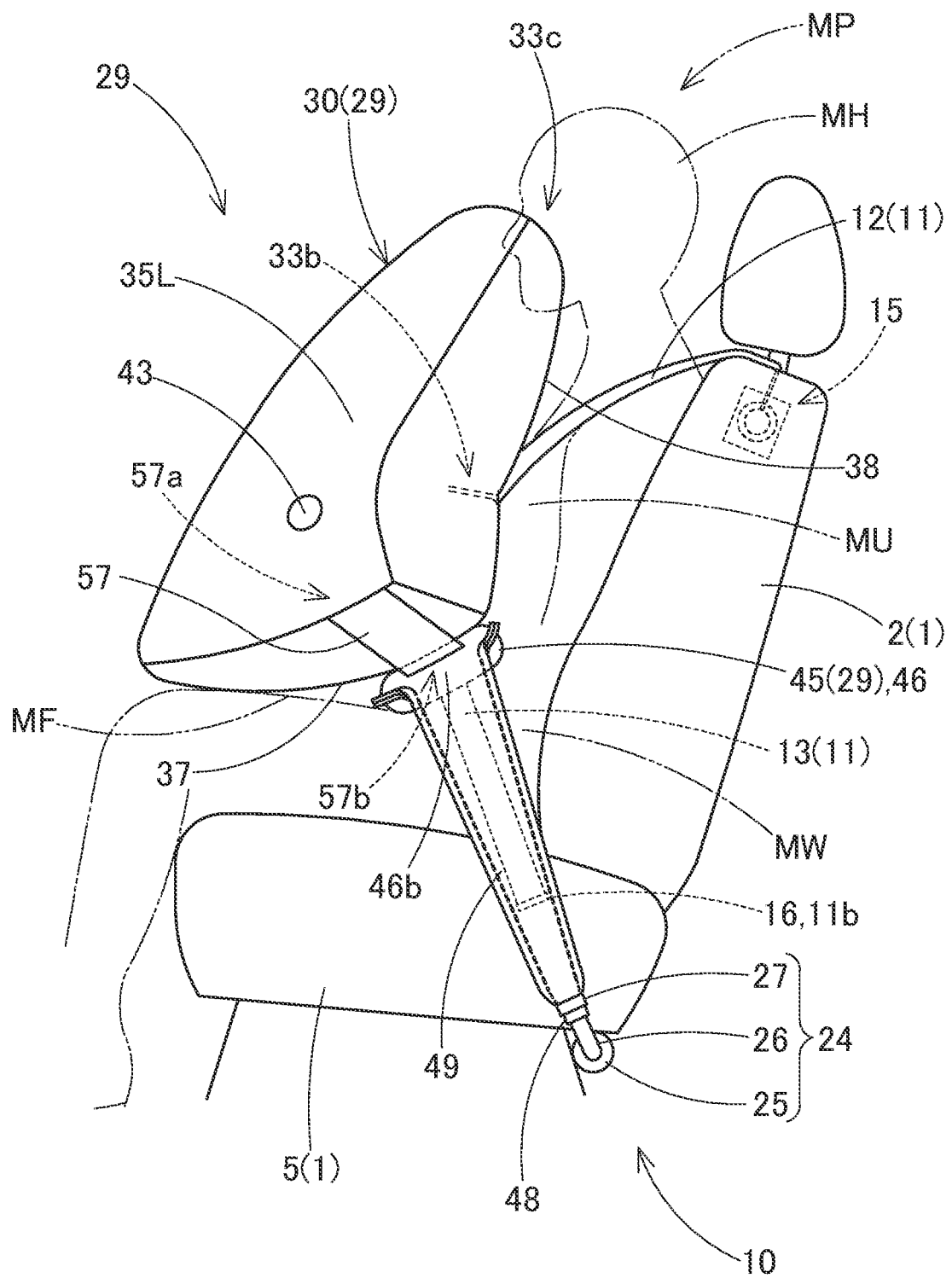
FIG. 7 is a left side view showing the airbag when inflation is completed when the occupant protection device operates.
Figure 8:
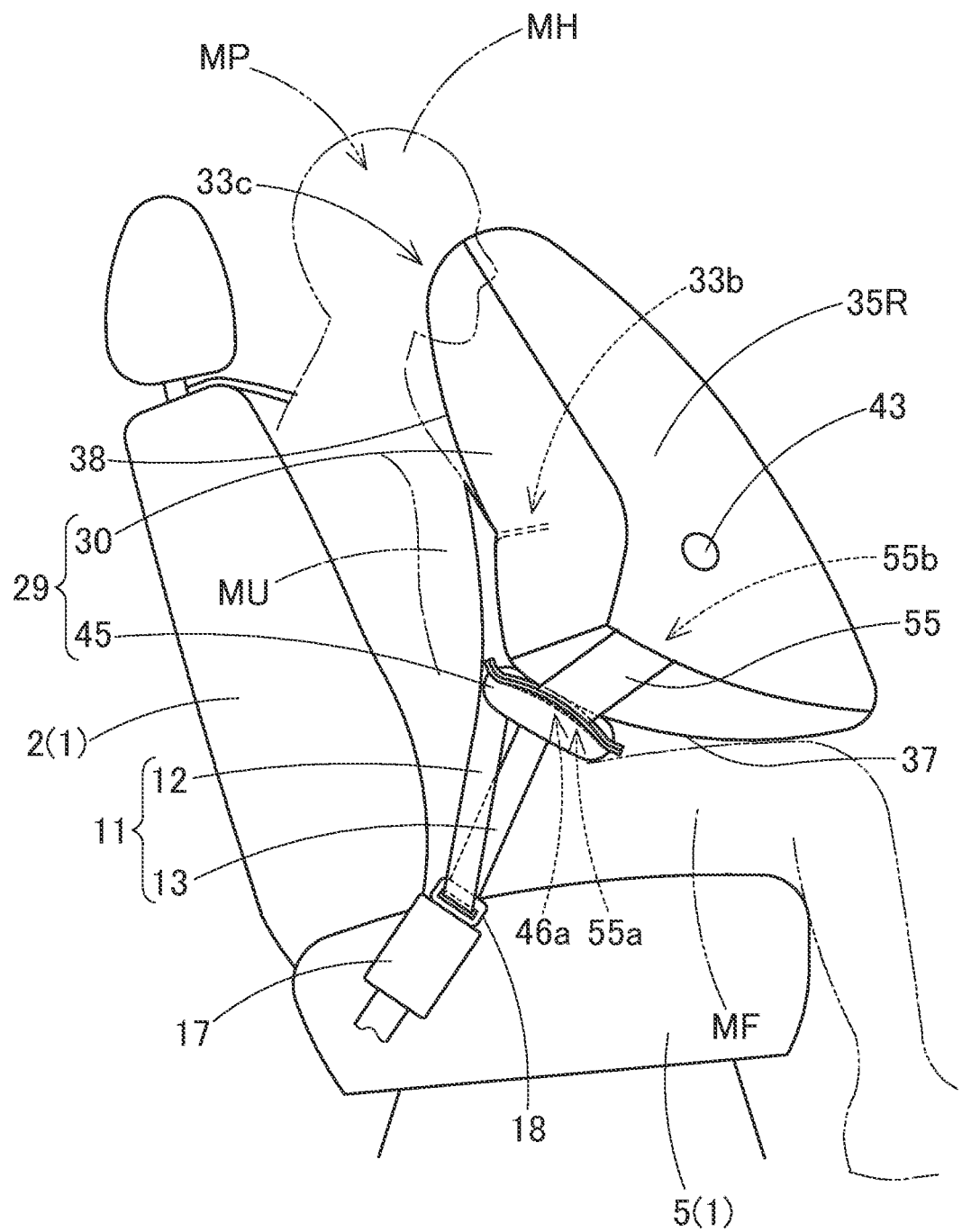
FIG. 8 is a right side view showing the airbag when inflation is completed when the occupant protection device operates.

As shown in FIGS. 7 and 8, a peripheral wall 31 of the bag main body portion 30 when inflation is completed is of an approximate triangular prism form when seen from a side. The bag main body portion 30 when inflation is completed includes a bottom wall portion 32 on a bottom face side, a back wall portion 33 on a back face side, a front wall portion 34 on a front face side, a left side wall portion 35L on a left face side, and a right side wall portion 35R on a right face side. The left side wall portion 35L and the right side wall portion 35R oppose each other in the left-right direction. A lower face 32*a* of the bottom wall portion 32 is a supported face 37 supported by a thigh portion MF of the occupant MP, and a back face 33*a* of the back wall portion 33 is an occupant restraining face 38 that receives the upper body MU of the occupant MP who moves forward.

Two inflow ports 40, which are aperture portions for causing inflating gas inside the conduit portion 45 to flow in, are provided in a vicinity of a back edge 32*b* of the bottom wall portion 32. Also, a venthole 43, which is an aperture portion for discharging excess inflating gas flowing into the bag main body portion 30, is provided in a front portion side of the left side wall portion 35L and a front portion side of the right side wall portion 35R. A tuck portion 33*b* is formed in the back wall portion 33 in such a way as to reduce an up-down direction dimension, whereby an upper end 33*c* side of the back wall portion 33 comes into proximity with a head portion MH of the occupant MP when inflation of the bag main body portion 30 is completed.

Figure 5:
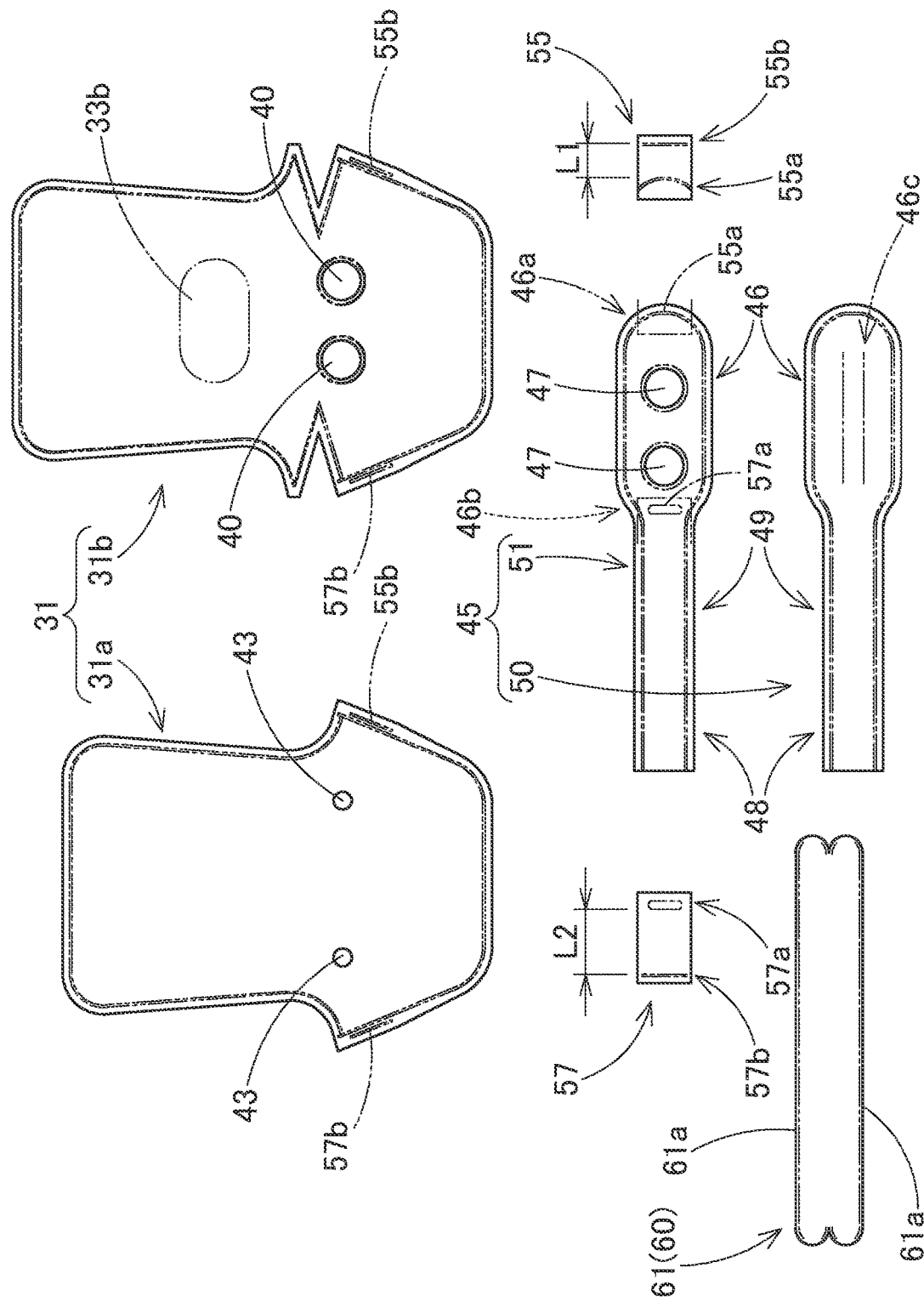
FIG. 5 is a drawing showing airbag configuration materials.

As shown in FIG. 5, the peripheral wall 31 of the bag main body portion 30 is formed by two sheet members, those being a front side region 31*a* and a back side region 31*b*, being sewn together. The front side region 31*a* includes a region forming the front wall portion 34, a front portion side of the left side wall portion 35L, and a front portion side of the right side wall portion 35R, and the back side region 31*b* includes a region forming the back wall portion 33, the bottom wall portion 32, a back portion side of the left side wall portion 35L, and a back portion side of the right side wall portion 35R.

A base portion 46 (one end portion) of the conduit portion is linked to the inflow port 40 of the bag main body portion of the airbag 29. A leading end portion 48 (another end portion) of the conduit portion 45 is linked to the pipe portion 26 of the inflator 24. The base portion 46 is wide, and a region between the leading end portion 48 and the base portion 46 forms a tubular intermediate portion 49 of a width dimension equivalent to a width dimension of the leading end portion 48. The conduit portion 45 is formed by sewing together outer peripheral edges of an outer side member 50 and a bag side member 51 whose external forms are the same as each other (refer to FIG. 5). A communication port 47 that communicates with the inflow port 40 of the bag main body portion 30 is provided in the base portion 46 of the conduit portion 45. A peripheral edge of the communication port 47 is sewn to a peripheral edge of the inflow port 40, whereby the conduit portion 45 is linked to the back edge 32*b* side of the bottom wall portion 32 forming the lower end 30*a* of the bag main body portion 30. The conduit portion 45 guides inflating gas discharged from the inflator main body 25 to the bag main body portion 30, thereby supplying the inflating gas to the bag main body portion 30. Also, the conduit portion 45 is such that a region of the outer side member 50 in the base portion 46 separated from the bag main body portion is sewn as a linking portion 46*c* to a bag housing region 22 of the lap belt portion 13.

When forming the conduit portion 45, the peripheral edge of the communication port 47 of the bag side member 51 is sewn to the peripheral edge of the inflow port 40 of the bag main body portion 30 before the outer peripheral edges of the outer side member 50 and the bag side member 51 are sewn together, and the linking portion 46*c* of the outer side member 50 is sewn to the bag housing region 22 of the lap belt portion 13.

The regulating tether 55 links a side wall portion, of the left side wall portion 35L and the right side wall portion 35R of the bag main body portion 30 when inflation is completed, on a side separated from the conduit portion 45 in the left-right direction of the seat 1, that is, in the embodiment, the right side wall portion 35R, and a leading side end portion 46*a* of the base portion 46 of the conduit portion 45 separated from the intermediate portion 49. Seen in another way, it can be said that the regulating tether 55 links the right side wall portion 35R, which is a side wall portion, of the left side wall portion 35L and the right side wall portion 35R of the bag main body portion 30 when inflation is completed, on a side separated from the inflator 24 in the left-right direction, and the conduit portion 45. A length dimension L1 of the regulating tether 55 is a length dimension such that the regulating tether 55 can regulate a rising up of the leading side end portion 46a of the base portion 46 of the conduit portion 45 at an initial stage of inflating gas flowing in. The length dimension L1 of the regulating tether 55 referred to here is a substantive length between a base portion 55a (one end portion) of the regulating tether 55 linked to the leading side end portion 46a of the base portion 46 of the conduit portion 45 and a leading end portion 55b (another end portion) linked to the right side wall portion 35R.

The regulating tether 57 links a side wall portion, of the left side wall portion 35L and the right side wall portion 35R of the bag main body portion 30 when inflation is completed, on a side near the conduit portion 45 in the left-right direction of the seat 1, that is, in the embodiment, the left side wall portion 35L, and a base side end portion 46b on the intermediate portion 49 side of the base portion 46 of the conduit portion 45. Seen in another way, it can be said that the regulating tether 57 links the left side wall portion 35L, which is a side wall portion, of the left side wall portion 35L and the right side wall portion 35R of the bag main body portion 30 when inflation is completed, on a side near the inflator 24 in the left-right direction, and the conduit portion 45. A length dimension L2 of the regulating tether 57 is a length dimension such that the regulating tether 57 can regulate a rising up of a region on the intermediate portion 49 side of the conduit portion 45 at an initial stage of inflating gas flowing in. The length dimension L2 of the regulating tether 57 referred to here is a substantive length between a base portion 57a (one end portion) of the regulating tether 57 linked to the base side end portion 46b of the base portion 46 of the conduit portion and a leading end portion 57b (another end portion) linked to the left side wall portion 35L.

Also, the length dimension L2 of the regulating tether 57 is set to be in the region of 1.5 to 2.5 times greater than the length dimension L1 of the regulating tether 55. In the present embodiment, the length dimension L1 is approximately 65 mm, and the length dimension L2 is approximately 135 mm, meaning that the length dimension L2 is approximately 2.1 times greater than the length dimension L1. The leading end portion 55b of the regulating tether 55 and the leading end portion 57b of the regulating tether 57 are linked in positions of bilateral symmetry to the left side wall portion 35L and right side wall portion 35R of the bag main body portion 30 when inflation is completed (refer to FIG. 5).

The occupant protection device 10 is such that the back side member 51 of the conduit portion 45 is linked to the bag main body portion 30 when the peripheral wall 31 is formed, together with which the leading end portions 55b and 57b of the tethers 55 and 57 are linked, the base portions 55a and 57a of the tethers 55 and 57 are linked to the back side member 51, and the bag main body portion 30 is folded. The outer side member 50 of the conduit portion 45 is sewn to the bag housing region 22 of the lap belt portion 13 of the seatbelt 11 in a state wherein the lower end fixed end 11b is not fixed to the anchor member 16 in a region of the linking portion 46c. Further, after the bag main body portion 30 is folded, the outer peripheral edges of the bag side member 51 and the outer side member 50 are sewn together, thereby forming the conduit portion 45. Further, after the folded bag main body portion 30 and a region of the base portion 46 of the conduit portion 45 are partially enclosed in an unshown strip-form wrapping member in order that the bag main body portion 30 and the region of the base portion 46 of the conduit portion 45 do not unravel, a whole of the bag housing region 22 of the lap belt portion 13 is covered with a bag cover 60. By so doing, the airbag 29 is disposed as a bag assembly 65 in the bag housing region 22 of the lap belt portion 13. Subsequently, while linking and fixing the fixed end 11b of the seatbelt 11 to the anchor member 16, the leading end portion 48 of the conduit portion 45 of the airbag 29 is linked to the pipe portion 26 of the inflator 24 by utilizing the clamp 27, whereby the occupant protection device is mounted in the seat 1. The bag cover 60 is formed of a sheet-form cover material 61 folded in two (refer to FIG. 5), encloses the folded bag main body portion 30 and the like, and is disposed by sewing together edges 61a stacked one on the other (refer to FIG. 3).

Figure 6:
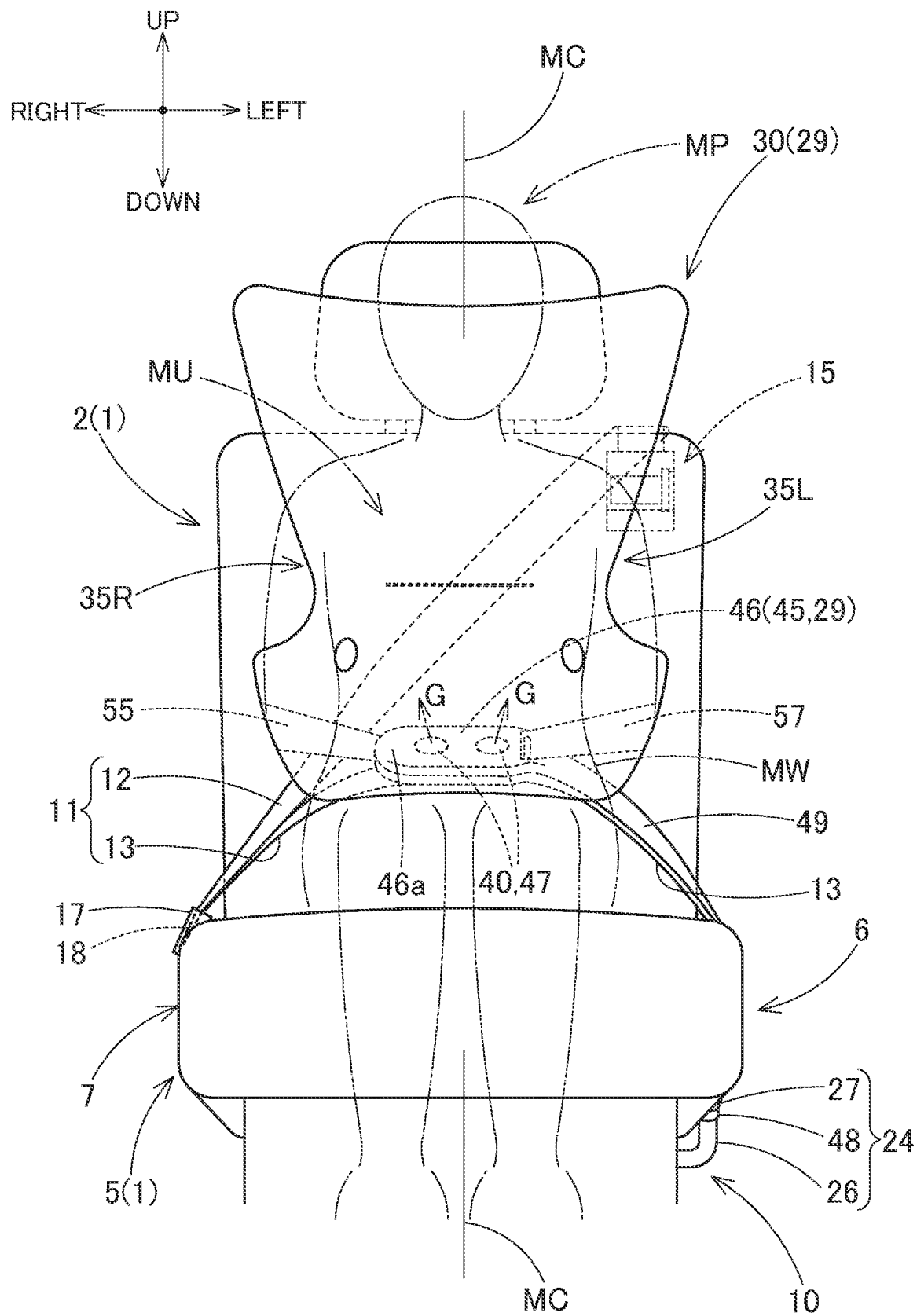
FIG. 6 is a front view showing the airbag when inflation is completed when the occupant protection device operates.

On the occupant protection device 10 operating in accompaniment to a collision or the like of the vehicle, inflating gas is discharged from the inflator 24, and the inflating gas flows into the base portion 46 of the conduit portion 45 via the intermediate portion 49, and flows into the bag main body portion 30 from the communication port 47 via the inflow port 40. On the inflating gas flowing into the bag main body portion 30, the bag main body portion 30 starts to inflate, is fed out from the bag housing region 22 of the lap belt portion 13, and completes inflation in front of the upper body MU of the occupant MP (refer to FIGS. 6 to 8).

Figure 9:
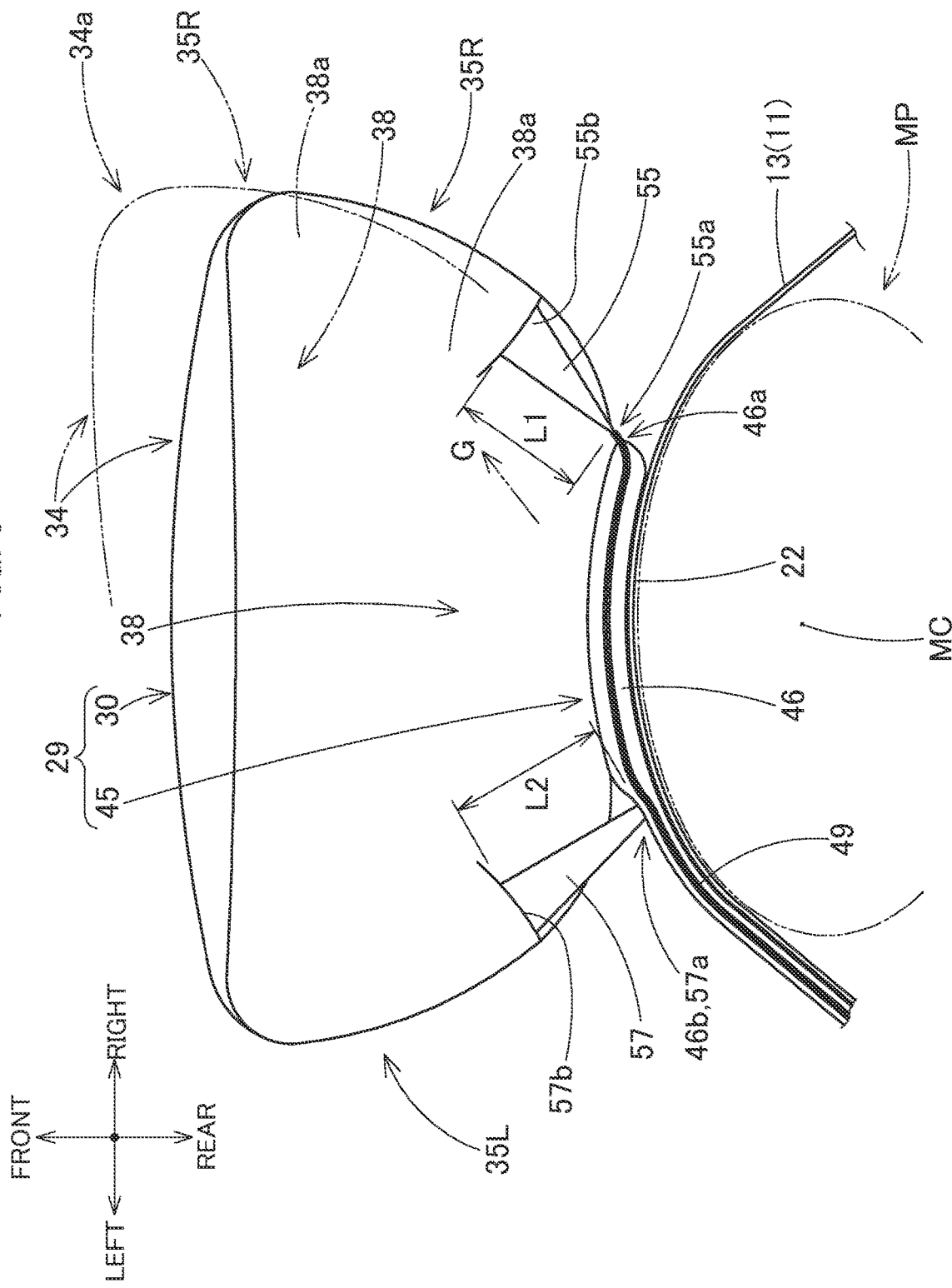
FIG. 9 is a schematic lateral sectional view showing the airbag when inflation is completed when the occupant protection device operates.

When an inflating gas G flows into the bag main body portion 30, a greater portion of the inflating gas G firstly comes into contact with the right side wall portion 35R, which is the side wall portion on the side separated from the inflator 24 (the conduit portion 45) in the left-right direction of the bag main body portion 30, and subsequently flows to the front wall portion 34 side, and is diffused over a whole of the bag main body portion 30. Because of this, pressure is liable to be exerted on the right side wall portion 35R with which the greater portion of the inflating gas G first comes into contact, and the right side wall portion 35R or a right edge 34a side of the front wall portion 34 attempts to move in such a way as to rise up from the base portion 46 of the conduit portion 45 due to the pressure (refer to a two-dotted chain line in FIG. 9). That is, the bag main body portion 30 attempts to move to the side separated from the upper body MU of the occupant MP due to the pressure received from the inflating gas G. In response to this, in the present embodiment, the rising up of the bag main body portion 30 is restricted (regulated) by the regulating tether 55. Because of this, separation from the upper body MU of the occupant MP of a right edge 38a side of the occupant restraining face 38 of the bag main body portion separated from the conduit portion 45 side is restricted, and the occupant MP is appropriately received and protected by the occupant restraining face 38 (refer to FIGS. 6 to 8).

In this way, according to the occupant protection device of the present embodiment, the bag main body portion 30 rising up when inflating gas flows into the bag main body portion 30 from the conduit portion 45 can be restricted. Because of this, occupant MP protection performance can be improved.

Also, the occupant protection device 10 has the regulating tether 57 in addition to the regulating tether 55. This means that when the inflating gas G flows into the bag main body portion 30, behavior such that the left side wall portion 35L separates from the conduit portion 45, and behavior such that the bag main body portion 30 sways to the left or right, are restricted (regulated) by the regulating tether 57. Because of this, a posture of the bag main body portion 30 is stabilized swiftly, and the occupant MP can be protected.

Figure 10:
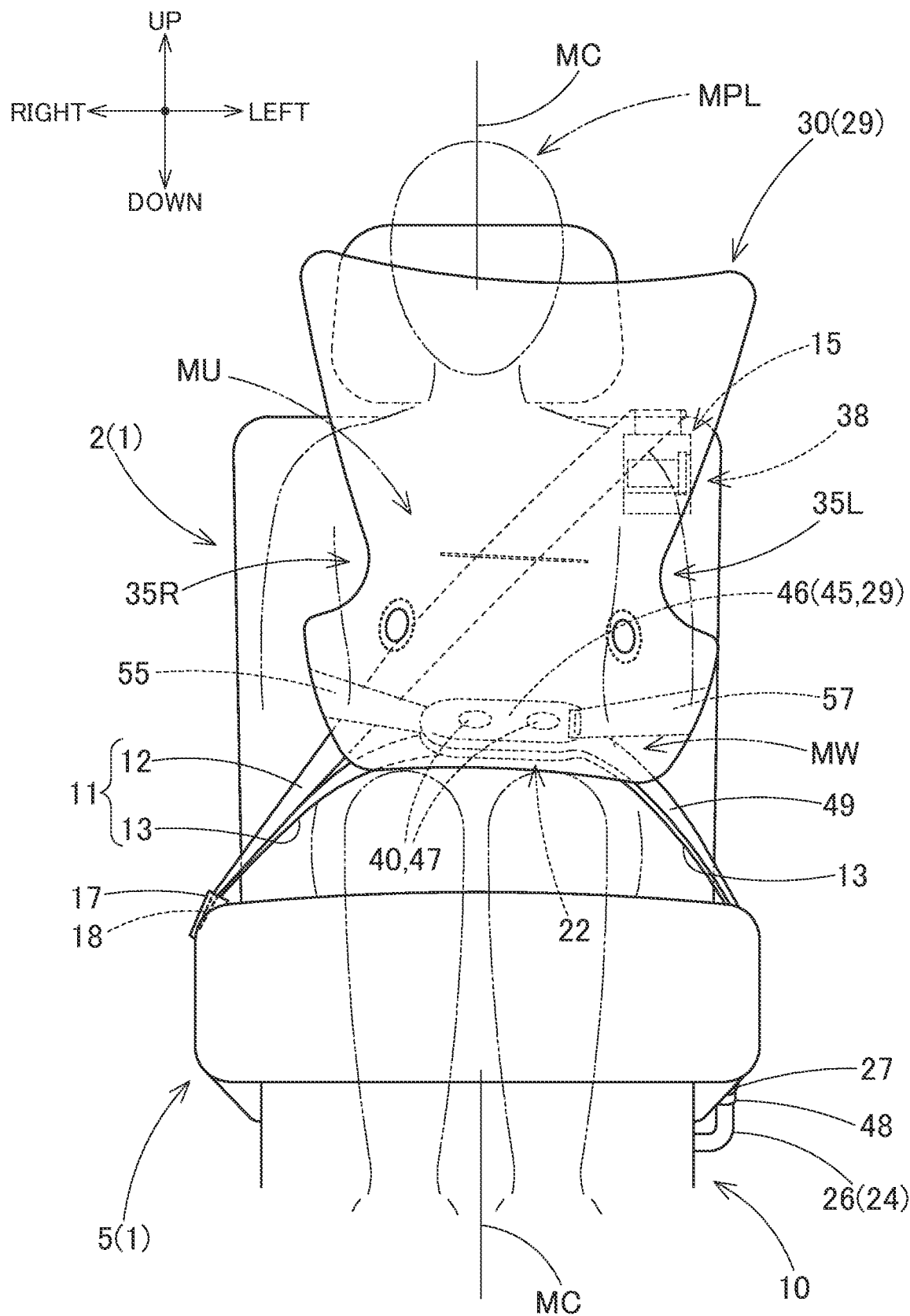
FIG. 10 is a front view of the seat in which the occupant protection device is mounted, and shows the airbag when inflation is completed in a case wherein a seatbelt is worn by a large-bodied occupant.
Figure 11:
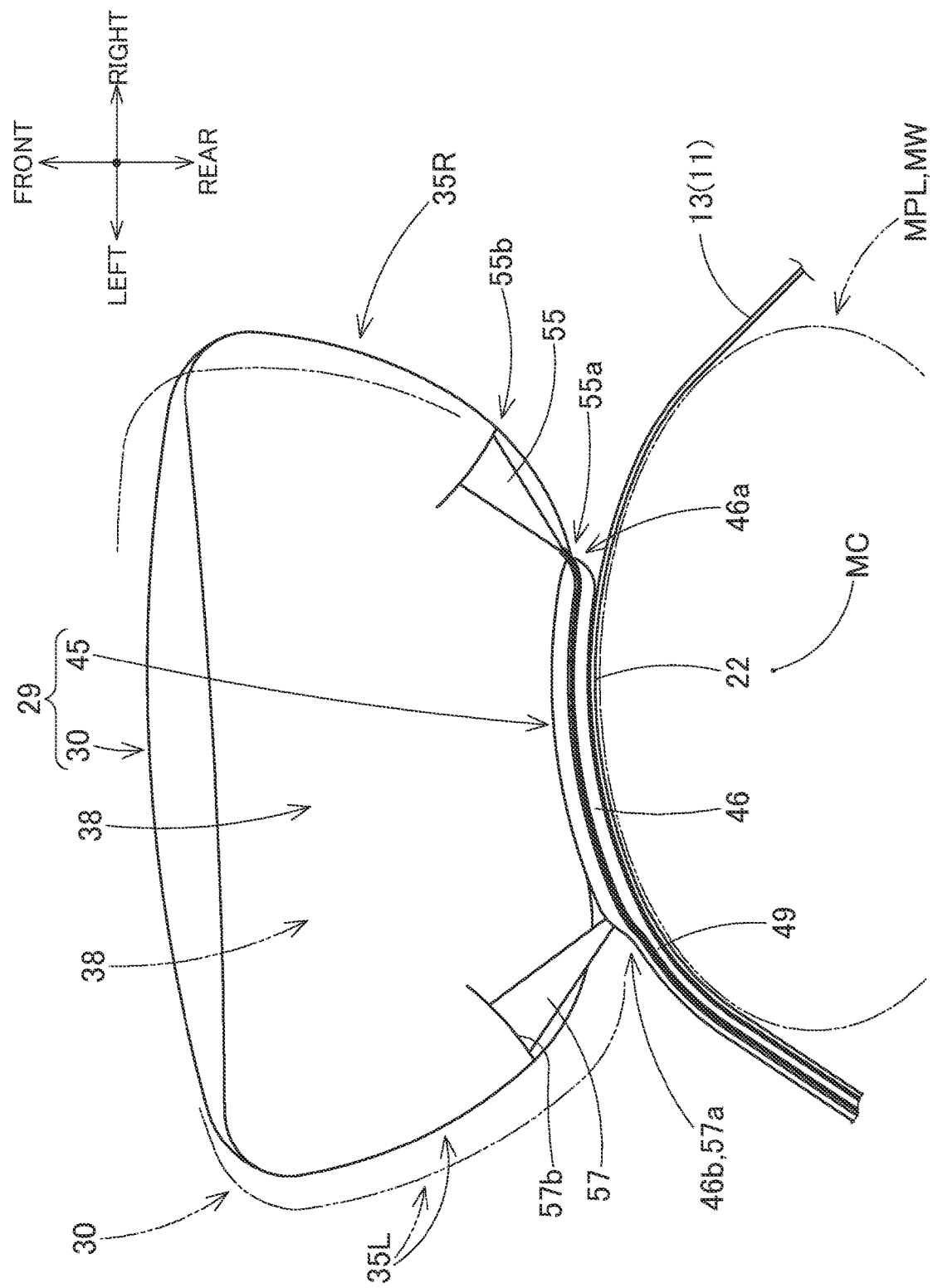
FIG. 11 is a schematic lateral sectional view of the airbag when inflation is completed in the case of a large-bodied occupant when the occupant protection device operates.

Also, the length dimension L2 of the regulating tether 57 is set to be longer than the length dimension L1 of the regulating tether 55 (L1<L2). Because of this, the occupant MP is protected easily when the occupant MP is a large-bodied occupant. That is, on a large-bodied occupant MPL putting on the seatbelt 11, a length dimension from the fixed end 11b of the seatbelt 11 to the tongue 18 in the lap belt portion 13 increases due to the waist portion MW of the large-bodied occupant MPL being thick, as shown in FIGS. 10 and 11. Because of this, the bag housing portion 22 of the lap belt portion 13 deviates to the fixed end 11b side (in the present embodiment, the left side, the side separated from the tongue 18) of the seatbelt 11 with respect to a left-right direction central portion MC of the large-bodied occupant MPL.

A hypothetical situation wherein the length dimension L2 of the regulating tether 57 and the length dimension L1 of the regulating tether 55 are equal is such that on the bag main body portion 30 inflating in this state, the bag main body portion is fed out from a central side of the waist portion MW of the occupant MPL toward the fixed end 11b side, as indicated by a two-dotted chain line in FIG. 11. Because of this, the occupant restraining face 38 of the bag main body portion 30 deviates to the fixed end 11b side with respect to the left-right direction central portion MC of the large-bodied occupant MPL.

In response to this, in the present embodiment, the length dimension L2 of the regulating tether 57, which is positioned in a position far from the tongue 18 in the left-right direction, is set to be longer than the length dimension L1 of the regulating tether 55, which is positioned in a position near the tongue 18. This means that on the bag main body portion 30 inflating, a direction in which the bag main body portion 30 is fed out is easily oriented forward, as indicated by a solid line in FIG. 11, and a deviation to the fixed end 11b side of the direction in which the bag main body portion 30 is fed out can be corrected. Because of this, the occupant restraining face 38 of the bag main body portion 30 deviating to the fixed end 11b side with respect to the left-right direction central portion MC of the large-bodied occupant MPL is restricted, and large-bodied occupant MPL protection performance can be improved.

Also, the positions in which the regulating tethers 55 and 57 are linked to the bag main body portion 30 need not necessarily be the left side wall portion 35L and right side wall portion 35R of the bag main body portion 30 in order to obtain the heretofore described advantage of improving the large-bodied occupant MPL protection performance. That is, provided that the regulating tether 57 is disposed in a position (a separated position) farther than the regulating tether 55 from the tongue 18 and the buckle 17 in the left-right direction of the seat 1, and that the length dimensions L1 and L2 of the regulating tethers 55 and 57 have a relationship of L1<L2, the heretofore described advantage can be obtained. For example, one end portion of the regulating tether 55 is linked to a right end side of the bottom wall portion 32 of the bag main body portion 30, and the other end portion is linked to the conduit portion 45. Further, one end portion of the regulating tether 57 is linked to a left end side of the bottom wall portion 32 of the bag main body portion 30, and the other end portion is linked to the conduit portion 45. By adopting this kind of configuration too, an advantage the same as that heretofore described can be obtained.

Figure 12:
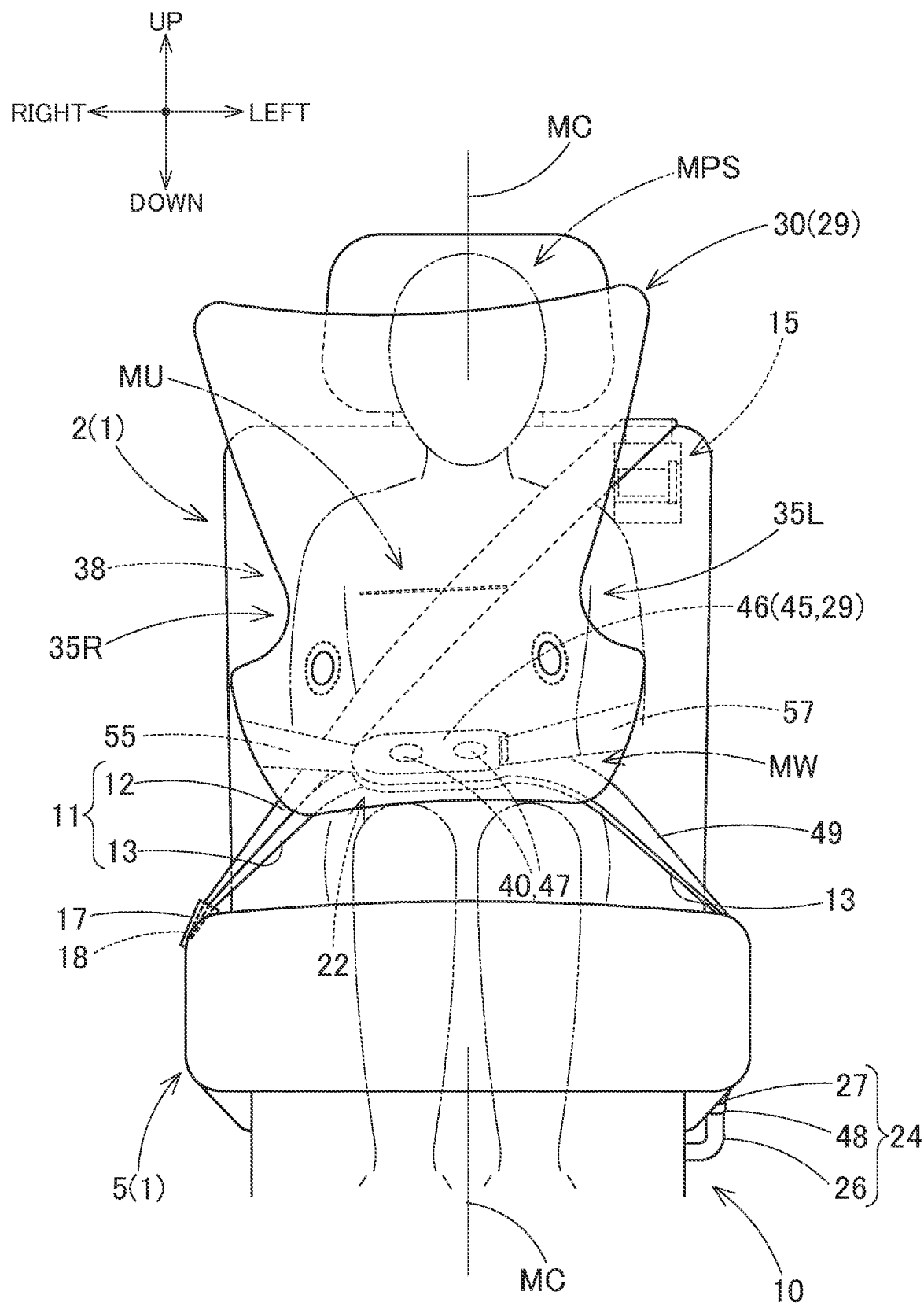
FIG. 12 is a front view of the seat in which the occupant protection device is mounted, and shows the airbag when inflation is completed in a case wherein the seatbelt is worn by a small-bodied occupant.

Even when the length dimension L2 of the regulating tether 57 is set to be longer than the length dimension L1 of the regulating tether 55, there is unlikely to be an effect on small-bodied occupant MP protection performance. That is, as shown in FIGS. 12 and 13, a case wherein the occupant MP is a small-bodied occupant MPS is such that on the small-bodied occupant MPS putting on the seatbelt 11, the length dimension from the fixed end 11b of the seatbelt 11 to the tongue 18 in the lap belt portion 13 decreases because the waist portion MW of the small-bodied occupant MPS is narrow in comparison with that of the large-bodied occupant MPL. Because of this, the bag housing region 22 of the lap belt portion 13 deviates to the tongue 18 side (the right side in the present embodiment) with respect to the left-right direction central portion MC of the small-bodied occupant MPS. As the waist portion MW of the small-bodied occupant MPS is narrow, however, an arc-form protruding state of the worn lap belt portion 13 is gentle (a curvature is small) in comparison with the case of the large-bodied occupant MPL. This means that even when the direction in which the bag main body portion 30 is fed out deviates to the tongue 18 side, there is little deviation in the left-right direction of the bag main body portion 30, and the small-bodied occupant MPS is protected stably by the occupant restraining face 38.

Also, in the present embodiment, the length dimension L2 of the regulating tether 57 is approximately 2.1 times greater than the length dimension L1 of the regulating tether 55. When the length dimension L2 is too great, handling the small-bodied occupant MPS becomes difficult, and when the length dimension L2 is too small, handling the large-bodied occupant MPL becomes difficult. Because of this, the length dimension L2 of the regulating tether 57 is preferably about 1.5 to 2.5 times greater than the length dimension L1 of the regulating tether 55, and more preferably still, about 1.8 to 2.3 times greater.

What is claimed is:
1. An occupant protection device, comprising:
a seatbelt having a lap belt portion that restrains a waist portion of an occupant seated in a seat;
an inflator that discharges an inflating gas;
an airbag that is provided in the lap belt portion, the airbag including a bag main body portion, which receives the occupant by inflating owing to the inflating gas being supplied, and a conduit portion, which is connected to the inflator, guides the inflating gas discharged from the inflator to the bag main body portion, and causes the inflating gas to flow into the bag main body portion;
a tether that links the conduit portion and a side wall portion, of a left side wall portion and a right side wall portion of the bag main body portion when inflation is completed, on a side separated from the inflator in a left-right direction; and
another tether that links the conduit portion and a side wall portion, of the left side wall portion and the right side wall portion of the bag main body portion when inflation is completed, on a side near the inflator in the left-right direction,
wherein the tether is linked to the conduit portion and the side wall portion such that links to the conduit portion and the side wall portion are not able to be released by inflation, and wherein the other tether is linked to the conduit portion and the side wall portion such that links to the conduit portion and the side wall portion are not able to be released by inflation.

2. The occupant protection device according to claim 1, wherein the tether is disposed on an exterior of the bag main body portion.

3. The occupant protection device according to claim 1, wherein the other tether is disposed on the exterior of the bag main body portion.

4. The occupant protection device according to claim 1, wherein the tether is linked to the conduit portion and to the side wall portion by being sewn thereto, and
wherein the another tether is linked to the conduit portion and the side wall portion by being sewn thereto.

5. An occupant protection device, comprising:
a seatbelt having a lap belt portion that restrains a waist portion of an occupant seated in a seat;
an inflator that discharges an inflating gas;
an airbag that is provided in the lap belt portion, the airbag including a bag main body portion, which receives the occupant by inflating owing to the inflating gas being supplied, and a conduit portion, which is connected to the inflator, guides the inflating gas discharged from the inflator to the bag main body portion, and causes the inflating gas to flow into the bag main body portion; and
a tether that links the conduit portion and a side wall portion, of a left side wall portion and a right side wall portion of the bag main body portion when inflation is completed, on a side separated from the inflator in a left-right direction,
further comprising another tether that links the conduit portion and a side wall portion, of the left side wall portion and the right side wall portion of the bag main body portion when inflation is completed, on a side near the inflator in the left-right direction,
wherein a length of the other tether is greater than a length of the tether.

6. The occupant protection device according to claim 5, further comprising a take-up unit that can take up the seatbelt,
wherein the inflator and the take-up unit are mounted in the seat.

7. An occupant protection device, comprising:
a seatbelt having a tongue, a buckle to which the tongue is joined, and a lap belt portion that restrains a waist portion of an occupant seated in a seat in a state where the tongue is joined to the buckle;
an inflator that discharges an inflating gas;
an airbag that is provided in the lap belt portion, the airbag including a bag main body portion, which receives the occupant by inflating owing to the inflating gas being supplied, and a conduit portion, which is connected to the inflator, guides the inflating gas discharged from the inflator to the bag main body portion, and causes the inflating gas to flow into the bag main body portion;
a first tether that links the conduit portion and the bag main body portion; and
a second tether that links the conduit portion and the bag main body portion, the second tether being disposed in a position farther in a left-right direction than the first tether from the buckle,
wherein a length of the second tether is configured to be greater than a length of the first tether.

8. The occupant protection device according to claim 7, wherein the first tether and the second tether are disposed on an exterior portion of the bag main body portion.

9. The occupant protection device according to claim 7, further comprising a take-up unit that can take up the seatbelt,
wherein the inflator and the take-up unit are mounted in the seat.

* * * * *